United States Patent
Andersson et al.

(10) Patent No.: US 9,030,162 B2
(45) Date of Patent: May 12, 2015

(54) BATTERY CHARGING SYSTEM FOR A HYBRID ELECTRIC VEHICLE

(75) Inventors: Christian Andersson, Götborg (SE); Jan Grundberg, Torslanda (SE); Tommy Hjelle, Torslanda (SE)

(73) Assignee: Volvo Technology Corporation, Göteborg (SE)

( * ) Notice: Subject to any disclaimer, the term of this patent is extended or adjusted under 35 U.S.C. 154(b) by 297 days.

(21) Appl. No.: 13/266,461

(22) PCT Filed: Apr. 27, 2010

(86) PCT No.: PCT/EP2010/002555
§ 371 (c)(1),
(2), (4) Date: Dec. 20, 2011

(87) PCT Pub. No.: WO2010/124831
PCT Pub. Date: Nov. 4, 2010

(65) Prior Publication Data
US 2012/0187919 A1     Jul. 26, 2012

Related U.S. Application Data

(60) Provisional application No. 61/172,803, filed on Apr. 27, 2009.

(51) Int. Cl.
*H02J 7/00* (2006.01)
*B60L 11/18* (2006.01)
(Continued)

(52) U.S. Cl.
CPC .............. *B60L 11/1811* (2013.01); *B60K 6/46* (2013.01); *B60L 11/1862* (2013.01);
(Continued)

(58) Field of Classification Search
USPC ........ 320/104, 109; 180/65.1, 65.21; 307/149
See application file for complete search history.

(56) References Cited

U.S. PATENT DOCUMENTS

| 6,768,285 B2 * | 7/2004 | James .......................... 320/104 |
| 6,781,343 B1 * | 8/2004 | Demachi et al. .............. 320/101 |

(Continued)

FOREIGN PATENT DOCUMENTS

| EP | 1056181 A2 | 11/2000 |
| JP | 10174201 A2 | 6/1998 |

(Continued)

OTHER PUBLICATIONS

International Search Report for corresponding International Application PCT/EP2010/002555.

(Continued)

*Primary Examiner* — Yalkew Fantu
(74) *Attorney, Agent, or Firm* — WRB-IP LLP

(57) ABSTRACT

A battery charging system and a method for a increasing endurance of a high voltage battery in a hybrid electric vehicle includes a high voltage battery for vehicle propulsion, a generator for charging the high voltage battery, a DC/DC converter for converting a high voltage to a low voltage, a low voltage battery charged with the low voltage, and an alternator, driven by an engine, and connected with the low voltage battery in parallel with the voltage converter. The method includes registering a parameter, where the parameter is at least one of a state of charge of said high voltage battery, and energy inflow/outflow to/from said high voltage battery to said vehicle drive motor or said generator, and controlling the low voltage in dependence of the registered parameter.

5 Claims, 3 Drawing Sheets

(51) Int. Cl.
*B60K 6/46* (2007.10)
*B60W 10/06* (2006.01)
*B60W 10/08* (2006.01)
*B60W 10/26* (2006.01)
*B60W 20/00* (2006.01)

(52) U.S. Cl.
CPC ........ B60L 11/1868 (2013.01); *B60L 2210/10* (2013.01); B60W 10/06 (2013.01); B60W 10/08 (2013.01); B60W 10/26 (2013.01); B60W 20/00 (2013.01); *B60W 2510/244* (2013.01); *Y02T 10/6217* (2013.01); *Y02T 10/6269* (2013.01); *Y02T 10/6286* (2013.01); *Y02T 10/7005* (2013.01); *Y02T 10/7044* (2013.01); *Y02T 10/7066* (2013.01); *Y02T 10/7216* (2013.01); *Y02T 90/127* (2013.01); *Y02T 90/14* (2013.01)

(56) References Cited

U.S. PATENT DOCUMENTS

| | | | | |
|---|---|---|---|---|
| 6,864,663 | B2* | 3/2005 | Komiyama et al. | 320/104 |
| 6,986,398 | B2* | 1/2006 | Obayashi | 180/65.28 |
| 7,075,194 | B2* | 7/2006 | Weidenheimer et al. | 307/71 |
| 2002/0139592 | A1* | 10/2002 | Fukasaku et al. | 180/65.2 |
| 2006/0113127 | A1* | 6/2006 | Dong et al. | 180/65.1 |
| 2006/0151219 | A1* | 7/2006 | Khan et al. | 180/65.1 |
| 2006/0232238 | A1* | 10/2006 | Horii | 320/104 |
| 2007/0124037 | A1 | 5/2007 | Moran | |

FOREIGN PATENT DOCUMENTS

| | | |
|---|---|---|
| JP | 2006280110 A2 | 10/2006 |
| JP | 2007223560 | 9/2007 |
| JP | 2008302852 A2 | 12/2008 |

OTHER PUBLICATIONS

JP10174201A (abstract and complete document) Jun. 26, 1998 Mitsubishi Motors Corp.
Japanese Official Action (Sep. 16, 2014) for corresponding Japanese Application 2012-507629.
Russian Substantive Examination Report (May 7, 2014) for corresponding Russian Application 2011047985/11.
Abstract of JP10174201 (translation) Jun. 26, 1998.
Japanese Official Action (Dec. 12, 2013) for corresponding Japanese Application 2012-507629.

* cited by examiner

BATTERY CHARGING SYSTEM FOR A HYBRID ELECTRIC VEHICLE

The present application is the U.S. national stage of International Application PCT/EP2010/002555, filed 26 Apr. 2010, which claims benefit of U.S. Provisional Application 61/172,803, filed 27 Apr. 2009.

BACKGROUND AND SUMMARY

The present invention relates to a battery charging system that is suitable for use in a hybrid electric vehicle (HEV).

The present invention also relates to a computer program, computer program product and a storage medium for a computer all to be used with a computer for executing said method.

Hybrid electric vehicles have been put to practical use in recent years and include a generator for generating electric power by being driven with an engine, a high voltage battery (also called vehicle drive battery or traction battery), a vehicle drive motor, etc. Hybrid electric vehicles are roughly classified into three types: (1) a parallel type in which driving wheels are rotated by using the driving force of the engine and the driving force of the vehicle drive motor in combination; (2) a series type in which driving wheels are rotated by the vehicle drive motor driven with electric power generated by driving the engine; and (3) a combination type of them.

In addition to the high voltage battery with a relatively high voltage (e.g. 600 V), HEV:s are further equipped with a low voltage battery (electric equipment battery) for storing a DC power that has a relatively low voltage (e.g. 24 V). This low voltage battery is used to operate vehicle-mounted electric equipment, which includes lamp equipment (such as head lamps, stop lamps, etc.), air-conditioning equipment (such as an air-conditioning compressor, capacitors, etc.), audio equipment (such as a stereo set, etc.), control equipment (such as various controllers, brake vacuum pumps, etc.), and so forth.

FIG. 1 discloses an example of a known electric circuit of the electric equipment power source unit of a conventional series type hybrid electric vehicle. As shown in the figure, a vehicle drive motor 110 is connected to driving wheels 111 so that power can be transferred for propulsion. The vehicle drive motor 110 is further connected to a high voltage battery 103 through an inverter 109. Power to the driving wheels is controlled by a motor controller 108.

A generator 102 is connected to an engine 101 so that it can generate electric power by being driven with the engine 101, the operation thereof being controlled by a generator controller 107. The generator 102 is further connected to a high voltage battery 103 through an inverter 109 so that the generated electric power is supplied to the high voltage battery 103.

A low voltage battery 106 is connected to the high voltage battery 103 through a DC/DC converter (voltage converter) 104, and to vehicle-mounted electric equipment 105.

Therefore, if the electric power of the high voltage battery 103 is supplied to the vehicle drive motor 110 through the inverter 109, the vehicle drive motor 110 is rotated and the driving wheels 111 connected with the vehicle drive motor 110 are rotated, whereby the vehicle can travel. If the electric power stored in the high voltage battery 103 is reduced, the engine 101 is driven and the generator 102 is operated by the generator controller 107. The electric power generated by the generator 102 is accumulated and stored in the high voltage battery 103.

The electric power stored in the high voltage battery 103 is converted to a low voltage by the DC/DC converter 104 and stored in the low voltage battery 106. The vehicle-mounted electric equipment 105 is operated by the supply of electric power from the low voltage battery 106.

In FIG. 1 the conventional auxiliary power source circuit is provided with an alternator 112 that generates electric power by being driven with the engine 101. The alternator 112 is connected with the low voltage battery 106 in parallel with the DC/DC converter 104. With this arrangement, electric power is supplied from two systems (which consists of or comprises the alternator 112 and DC/DC converter 104) to the low voltage battery 106. This technique is disclosed for example in US2006/0232238 and Japanese Laid-Open Patent Publication No. Hei 10-174201.

The output voltages of the DC/DC converter 104 and alternator 112 are basically constant, but the voltages of their actual charging circuit sections vary with the magnitude of equipment load or state of the low voltage battery 106.

As a charging path from the power supply source to the low voltage battery 106, there are two paths: (1) a first path where the low voltage battery 106 is charged by the DC/DC converter 104 to which electric power is supplied from the generator 102 and (2) a second path where it is charged by the alternator 112 driven with the engine 101.

A problem with said prior art technology is that when too much energy (power) is transmitted in and/or out of the high voltage battery in a HEV the endurance of the battery is reduced. The endurance of the high voltage battery is also reduced by deep discharging.

It is desirable to reduce the effect of the above problem and to provide an improved battery charging system for a hybrid electric vehicle.

The battery charging system for a HEV comprises (includes, but is not necessarily limited to): a high voltage battery for supplying electric power to a vehicle drive motor; a generator for charging said high voltage battery; a DC/DC converter for converting a high voltage to a low voltage; a low voltage battery that is charged with said low voltage from said DC/DC converter; and an alternator, which is driven by an engine, connected with said low voltage battery in parallel with said voltage converter. The invention is characterized in that a control unit is arranged to register a parameter, where said parameter is at least one of a:

state of charge of said high voltage battery,
energy inflow/outflow to/from said high voltage battery to said vehicle drive motor or said generator;

and where said control unit is arranged to control said low voltage in dependence of said registered parameter.

The advantage with the system according to the invention is that endurance of the high voltage battery can be extended without decrease in vehicle driving performance. The solution is cost effective and easy to implement.

According to one embodiment of the battery charging system according to the invention, said control unit is arranged to control the low voltage of the DC/DC converter to be higher than a voltage from said alternator when state of charge of said high voltage battery is high.

According to another embodiment of the battery charging system according to the invention, said control unit is arranged to control the low voltage of the DC/DC converter to be higher than a voltage from said alternator when an inflow of energy to said high voltage battery is registered.

According to one embodiment of the battery charging system according to the invention, said control unit is arranged to control the low voltage of the DC/DC converter to be lower than a voltage from said alternator when state of charge of said high voltage battery is low.

According to another embodiment of the battery charging system according to the invention, said control unit is arranged to control the low voltage of the DC/DC converter to be lower than a voltage from said alternator when an outflow of energy from said high voltage battery is registered.

BRIEF DESCRIPTION OF THE DRAWING

The present invention will be described in greater detail below with reference to the accompanying drawings which, for the purpose of exemplification, show further preferred embodiments of the invention and also the technical background, and in which.

DETAILED DESCRIPTION

Figure 1:
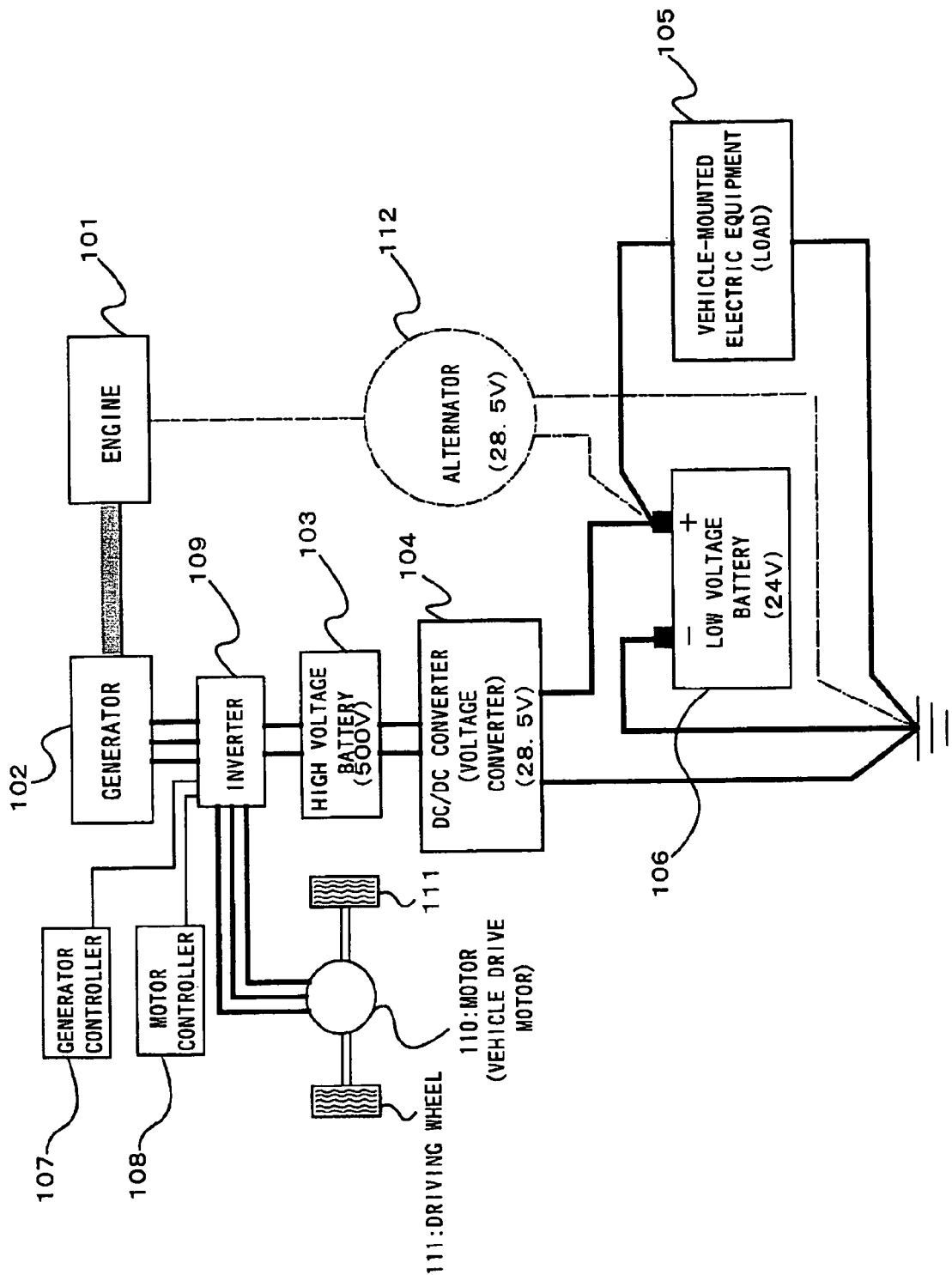
FIG. 1 diagrammatically shows an example of a known electric circuit of the electric equipment power source unit of a HEV.

According to the invention a control unit (not shown) can be arranged in or in connection to the battery charging system (as for example described in connection to FIG. 1) where said control unit is arranged to register a parameter, where said parameter is at least one of a:
state of charge of said high voltage battery,
energy inflow/outflow to/from said high voltage battery to said vehicle drive motor or said generator;
and where said control unit is arranged to control said low voltage in dependence of said registered parameter.

Said parameter can be registered continuously during driving of the vehicle.

In a further embodiment of the invention said control unit can be programmed to control the low voltage of the DC/DC converter to be higher than a voltage from said alternator when state of charge of said high voltage battery is high. In corresponding way said control unit can be programmed to control the low voltage of the DC/DC converter to be higher than a voltage from said alternator when an energy inflow to said high voltage battery is registered. Said control unit can also be programmed to control the low voltage of the DC/DC converter to be lower than a voltage from said alternator when state of charge of said high voltage battery is low. And if an energy outflow from said high voltage battery is registered then said control unit can be arranged to control the low voltage of the DC/DC converter to be lower than a voltage from said alternator.

Figure 2:
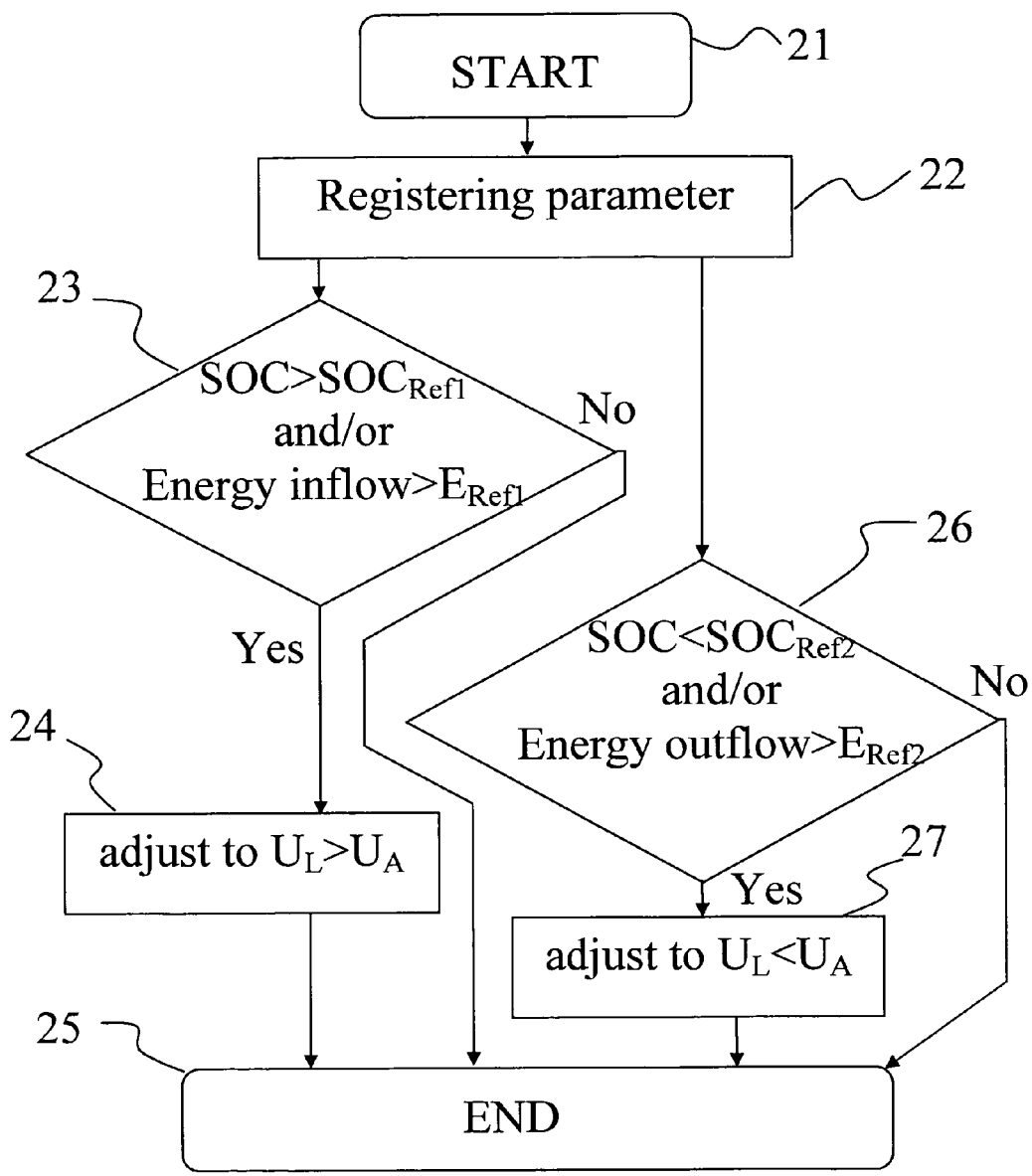
FIG. 2 discloses a flowchart of an embodiment of the invention.

FIG. 2 discloses the inventive procedure in a flowchart. In a first step 21 said control unit can be programmed to start the sequence. In step 22 said control unit is programmed to register said parameters. In step 23 registered value (SOC and/or Energy inflow) of said parameter/-s is compared to a reference value (SOCRef1 and/or ERef1 respectively). If the registered value is bigger than said reference value in step 23 (i. e. SOC is high and/or energy inflow above reference value) then the low voltage of the DC/DC converter UL is adjusted to a value higher than the voltage UA from said alternator in step 24. After step 24 the sequence ends in step 25. If the registered value/-s in step 23 is not bigger than said reference values then the sequence will end and no adjustment of said low voltage UL is performed.

In corresponding way said control unit is programmed to compare in step 26 registered value (SOC and/or Energy outflow) of said parameter/-s with a second reference value (SOCRef2 and/or ERef2 respectively). If the registered SOC value is smaller than said second reference value SOCRef2 in step 26 then the low voltage of the DC/DC converter UL is adjusted to a value lower than the voltage UA from said alternator in step 27. If the registered Energy outflow value is bigger than said second reference value ERef2 in said step 26 then the low voltage UL of the DC/DC converter can also be adjusted to a value lower than the voltage UA from said alternator in step 27.

After step 27 the sequence ends in step 25. If the registered value/-s in step 23 is not bigger than said reference values then the sequence will end in step 25 and no adjustment of said low voltage is performed. In corresponding way if the registered values in step 26 do not initiate an adjustment of said low voltage UL of the DC/DC converter then the sequence will end in step 25 and no adjustment of said low voltage is performed.

In the in FIG. 2 disclosed embodiment the reference values can differ, where SOCRef1>SOCRef2 and ERef1> or <ERef2, or said reference values can be the same (i. e. SOCRef1=SOCRef2 and ERef1=ERef2). The selection of these reference values can differ between different battery system specifications.

During driving said sequence can be executed continuously in order to adjust the level of the low voltage UL from the DC/DC converter.

Both mentioned parameters affect the endurance of the high voltage battery and by registering prevailing level of one of or both said parameters, the low voltage can be adjusted accordingly in order to milder the negative impact on the endurance of the high voltage battery.

Said inventive battery system embodiments can also be implemented in a parallel hybrid vehicle or other types of HEV:s comprising corresponding high voltage battery, a generator, a DC/DC converter, a low voltage battery that is charged with a low voltage from said DC/DC converter and an alternator, which is driven by an engine, connected with said low voltage battery in parallel with said voltage converter.

Figure 3:
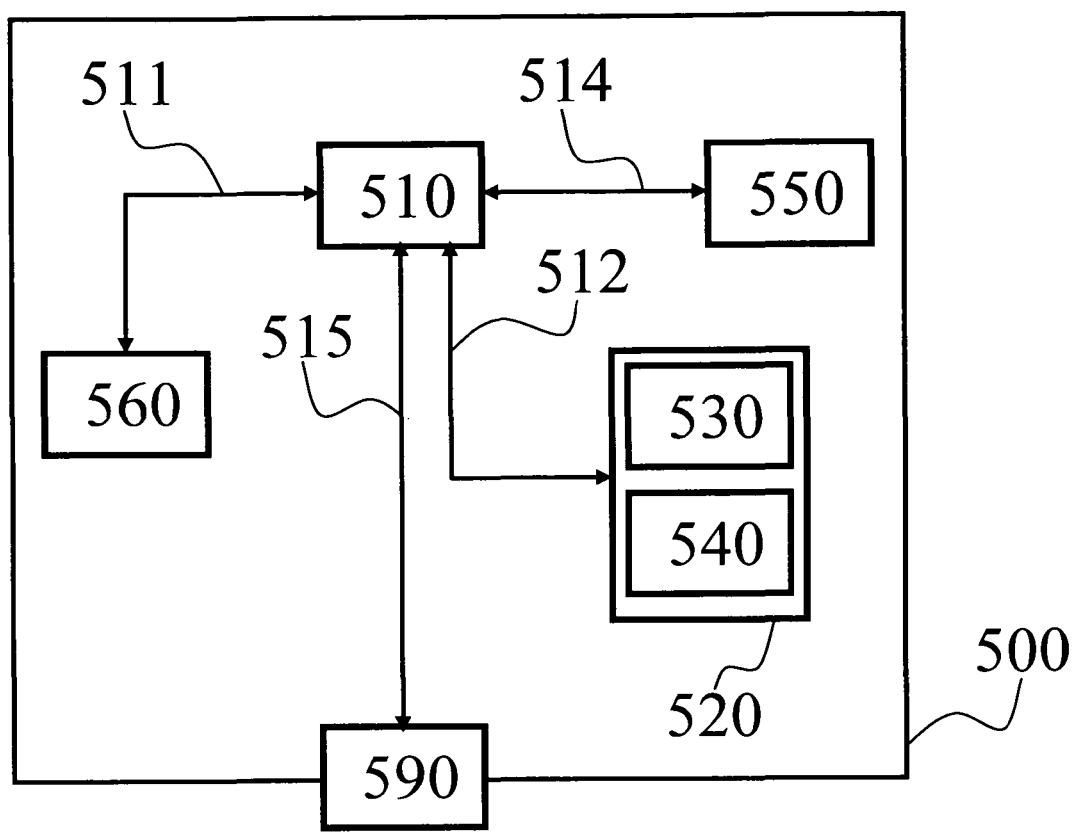
FIG. 3 shows the invention applied on a computer arrangement.

FIG. 3 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the above described control unit. The data-processing unit 510 can comprise, for example, a microcomputer.

The memory 520 also has a second memory part 540, in which a program for controlling the target gear selection function according to the invention is stored. In an alternative embodiment, the program for controlling the target gear selection function is stored in a separate nonvolatile storage medium 550 for data, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile storage medium 550.

The data-processing unit 510 is tailored for communication with the storage memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile storage medium 550.

The invention should not be deemed to be limited to the embodiments described above, but rather a number of further variants and modifications are conceivable within the scope of the following patent claims.

The invention claimed is:

1. A battery charging system for a hybrid electric vehicle comprising:
   a high voltage battery for supplying electric power to a vehicle drive motor;
   a generator for charging the high voltage battery; a DC/DC converter for convening a high voltage to a low voltage;
   a low voltage battery that is charged with the low voltage from the DC/DC converter; and
   an alternator, which is driven by an engine, connected with the low voltage battery in parallel with the voltage converter;
   wherein a control unit is arranged to register a parameter, where the parameter is at least one of a:
      state of charge of the high voltage battery,
      energy inflow/outflow to/from the high voltage battery to the vehicle drive motor or the generator;
   and wherein the control unit is arranged to control the low voltage of the DC/DC converter to be higher than a voltage from the alternator when either or both of a state of charge of the high voltage battery is high and when an inflow of energy to the high voltage battery from the generator is registered, and wherein the control unit is arranged to control the low voltage of the DC/DC converter to be lower than a voltage from the alternator when either or both of a state of charge of the high voltage battery is low and when an outflow of energy from the high voltage battery to the vehicle drive motor is registered.

2. A method for increasing endurance of a high voltage battery in a hybrid electric vehicle comprising: a high voltage battery for supplying electric power to a vehicle drive motor; a generator for charging the high voltage battery: a DC/DC converter for converting a high voltage to a low voltage; a low voltage battery that is charged with the low voltage from the DC/De converter; and an alternator, which is driven by an engine, connected with the low voltage battery in parallel with the voltage converter; and wherein the method is the comprising:
   registering a parameter, where the parameter is at least one of a:
      state of charge of the high voltage battery,
      energy inflow/outflow to/from the high voltage battery to the vehicle drive motor or the generator;
   controlling the low voltage from the DC/DC converter to be higher or lower than a voltage from the alternator in dependence of the registered parameter;
   controlling the low voltage of the DC/DC converter to be higher than a voltage from the alternator when either or both of state of charge of the high voltage battery is high and an inflow of energy to the high voltage battery from the generator is registered; and
   controlling the low voltage of the DC/DC converter to be lower than a voltage from the alternator when either or both of state of charge of the high voltage battery is low and an outflow of energy from the high voltage battery to the vehicle drive motor is registered.

3. A computer program comprising program code means for performing all the steps of claim 2 when the program is run on a computer.

4. A computer program product comprising program code stored on a non-volatile computer readable medium for performing all steps of claim 2.

5. A nonvolatile storage medium for use in a computing environment having a memory comprising a computer readable program code to perform the steps of claim 2.

* * * * *